(12) United States Patent
Farooq et al.

(10) Patent No.: US 10,403,139 B2
(45) Date of Patent: Sep. 3, 2019

(54) LOCAL NAVIGATION SYSTEM FOR VEHICLE NAVIGATION

(71) Applicant: Ford Global Technologies, LLC, Dearborn, MI (US)

(72) Inventors: S.M. Iskander Farooq, Novi, MI (US); Mark A. Cuddihy, New Boston, MI (US); Mohammad Omar Faruque, Ann Arbor, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 24 days.

(21) Appl. No.: 15/710,530

(22) Filed: Sep. 20, 2017

(65) Prior Publication Data

US 2019/0088123 A1 Mar. 21, 2019

(51) Int. Cl.
| | |
|---|---|
| *G08G 1/0967* | (2006.01) |
| *G01C 21/36* | (2006.01) |
| *G08G 1/0968* | (2006.01) |
| *G08G 1/0969* | (2006.01) |
| *G08G 1/017* | (2006.01) |
| *G05D 1/02* | (2006.01) |

(52) U.S. Cl.
CPC ... *G08G 1/096708* (2013.01); *G01C 21/3626* (2013.01); *G01C 21/3644* (2013.01); *G05D 1/021* (2013.01); *G08G 1/017* (2013.01); *G08G 1/0969* (2013.01); *G08G 1/096844* (2013.01)

(58) Field of Classification Search
CPC ........... G08G 1/096708; G08G 1/0969; G08G 1/096844; G08G 1/017; G01C 21/3626; G01C 21/3644; G05D 1/021
USPC ........................................................ 701/420
See application file for complete search history.

(56) References Cited

U.S. PATENT DOCUMENTS

| | | | |
|---|---|---|---|
| 4,829,442 A | 5/1989 | Kadonoff et al. | |
| 6,049,745 A | 4/2000 | Douglas et al. | |
| 2007/0021907 A1 | 1/2007 | Kato et al. | |
| 2017/0192426 A1* | 7/2017 | Rust ...................... | B60W 30/00 |

FOREIGN PATENT DOCUMENTS

| | | |
|---|---|---|
| DE | 3923458 A1 | 1/1991 |
| KR | 010955 B1 | 8/1997 |

OTHER PUBLICATIONS

US 9,426,774 B2, 08/2016, Skaaksrud (withdrawn)

* cited by examiner

*Primary Examiner* — Brian P Sweeney
(74) *Attorney, Agent, or Firm* — Frank A. MacKenzie; Bejin Bieneman PLC

(57) ABSTRACT

A system includes a processor and a memory. The memory stores instructions executable by the processor to, upon receiving a first message including a map, a vehicle location, and a first location, navigate the vehicle to the first location, and then, after stopping the vehicle at the first location, navigate the vehicle to a second location upon receiving a second message.

20 Claims, 6 Drawing Sheets

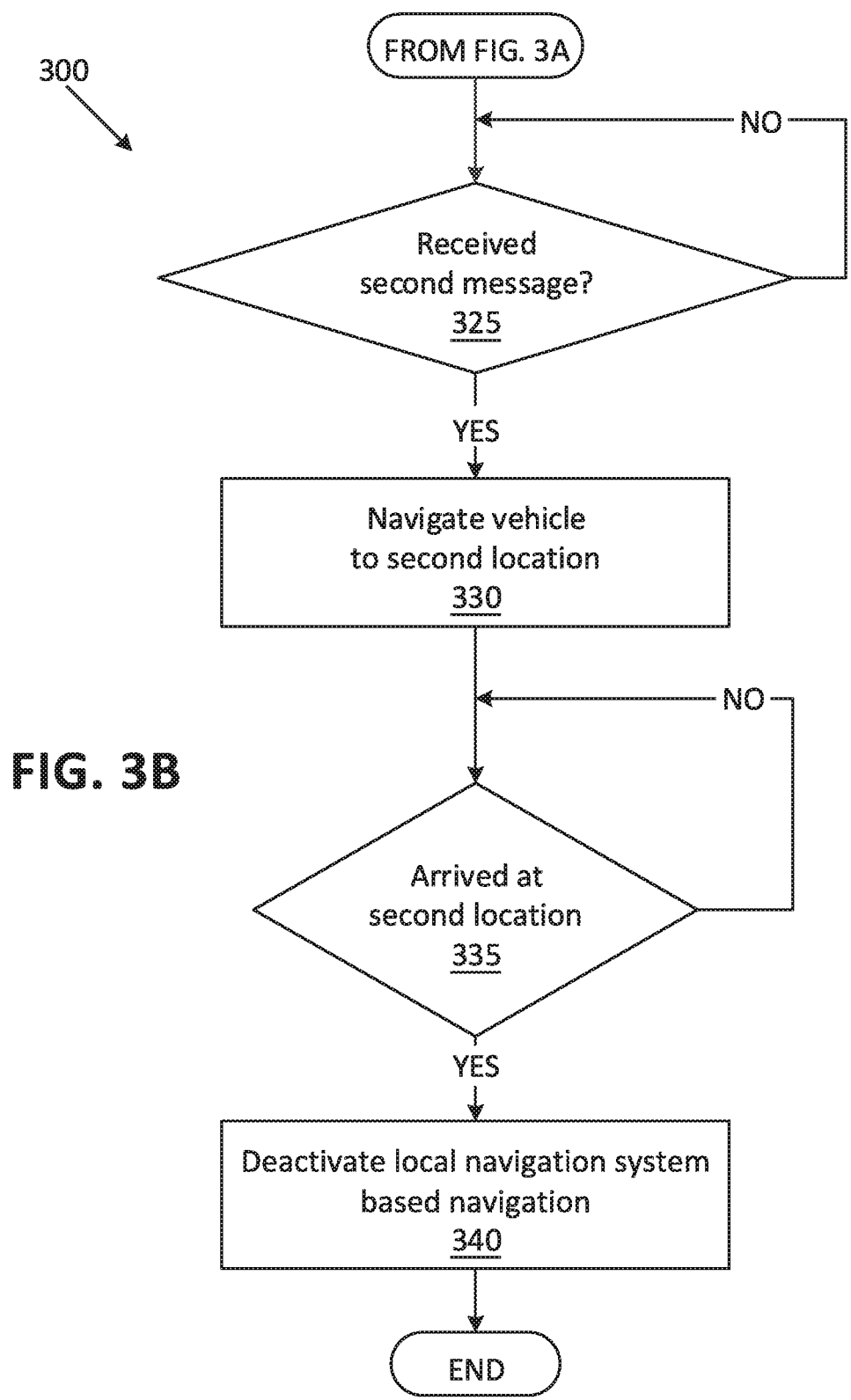

LOCAL NAVIGATION SYSTEM FOR VEHICLE NAVIGATION

BACKGROUND

Vehicles may navigate in various environments, e.g., a roadway, a parking garage, a manufacturing plant, etc. In certain environments, such as a manufacturing plant, it may be desirable to monitor a vehicle location and/or vehicle navigation. However, systems problems arise in monitoring a vehicle location and navigation in certain environments. For example, it is a problem that sensors and/or other monitoring hardware may not be available and/or may suffer from limitations due to infrastructure, such as walls as the like.

BRIEF DESCRIPTION OF THE DRAWINGS

FIGS. 3A-3B are a flowchart of an exemplary process for navigating a vehicle to a first location and then to a second location.

DETAILED DESCRIPTION

Introduction

Figure 1:
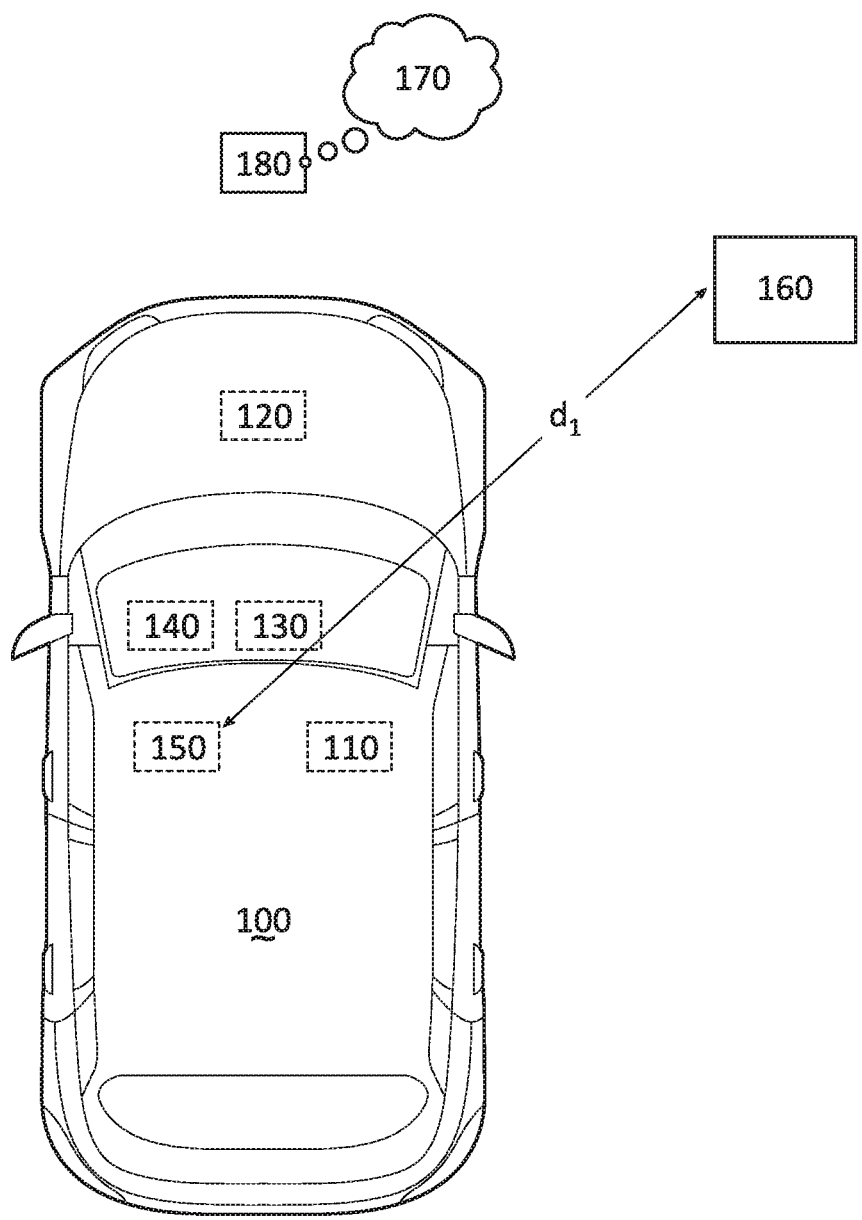
FIG. 1 is a block diagram of an example vehicle local navigation system.

Disclosed herein is a system including a processor and a memory. The memory stores instructions executable by the processor to, upon receiving a first message including a map, a vehicle location, and a first location, navigate the vehicle to the first location, then, after stopping the vehicle at the first location, to navigate the vehicle to a second location upon receiving a second message.

The second message may include the second location.

The map may specify locations according to a two-dimensional Cartesian coordinate system.

The map may include coordinates of location markers including at least one of a cone, a post, a pattern, a text, and a sign.

The map may include physical characteristics of the location markers.

Determining current location coordinates of the vehicle may include detecting a location marker based on received image data, determining a location of the vehicle relative to the location marker, and determining the current location coordinates of the vehicle based on the detected location marker and the determined location of the vehicle relative to the location marker.

The memory may store further instructions executable by the processor to receive image data from a vehicle sensor, identify a path to the first location based on the received image data and the first message, and navigate the vehicle to the first location via the identified path.

The memory may store further instructions executable by the processor to identify the path based on at least one of lane markings and location markers detected in the received image data.

Further disclosed herein is a method including, upon receiving a first message including a map, a vehicle location, and a first location, navigating the vehicle to the first location, then, after stopping the vehicle at the first location, navigating the vehicle to a second location upon receiving a second message.

The second message may include the second location.

The map may specify locations according to a two-dimensional Cartesian coordinate system.

The map may include coordinates of location markers including at least one of a cone, a post, a pattern, a text, and a sign.

The map may further include physical characteristics of the location markers.

The method may further include determining current location coordinates by detecting a location marker based on received image data, determining a location of the vehicle relative to the location marker, and determining the current location coordinates of the vehicle based on the detected location marker and the determined location of the vehicle relative to the location marker.

The method may further include receiving image data from a vehicle sensor, identifying a path to the first location based on the received image data and the first message, and navigating the vehicle to the first location via the identified path.

Identifying the path may be based on at least one of lane markings and location markers detected in the received image data.

Further disclosed herein is a system including a processor and a memory. The memory stores instructions executable by the processor to, upon receiving a first message from a first local navigation system at a first location, navigate a vehicle to the first location, and then, after stopping the vehicle at the first location, to navigate the vehicle to a second location upon receiving a second message from a second local navigation system at the second location.

The memory may store further instructions executable by the processor to receive image data from a vehicle sensor, to identify a path to the first location based on the received image data and the first message, and to navigate the vehicle to the first location via the identified path.

The memory may store further instructions executable by the processor to identify the path based on lane markings detected in the received image data.

The memory may store further instructions executable by the processor to deactivate a vehicle powertrain upon arriving at the first location.

Further disclosed is a computing device programmed to execute the any of the above method steps. Yet further disclosed is an aerial drone comprising the computing device. Yet further disclosed is a vehicle comprising the computing device.

Yet further disclosed is a computer program product comprising a computer readable medium storing instructions executable by a computer processor, to execute the any of the above method steps.

Exemplary System Elements

FIG. 1 is a block diagram of a host vehicle 100. The host vehicle 100 may be powered in variety of known ways, e.g., with an electric motor and/or internal combustion engine. The host vehicle 100 may include a computer 110, actuator(s) 120, sensor(s) 130, a human machine interface (HMI) 140, and a wireless signal transceiver 150, each of which are discussed in more detail below.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or semi-autonomous mode. For purposes of this disclosure, an autonomous mode is defined as one in which each of vehicle 100 propulsion (e.g., via a powertrain including an electric motor and/or an internal combustion engine), braking, and steering are controlled by the computer 110; in a semi-autonomous mode, the computer 110 controls one or two of vehicle 100 propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 is generally arranged for communications on a vehicle communication network, e.g., including a communication bus such as a controller area network (CAN) or the like. The computer 110 may include or be communicatively coupled to, e.g., via a vehicle communications bus as described further below, more than one processor, e.g., controllers or the like included in the vehicle for monitoring and/or controlling various subsystems such as a powertrain, brake, steering, etc.

Via the vehicle network, the computer 110 may transmit messages to various devices in the vehicle 100 and/or receive messages from the various devices, e.g., controllers, actuators, sensors, etc., including sensors 130. Alternatively or additionally, in cases where the computer 110 actually comprises multiple devices, the vehicle communication network may be used for communications between devices represented as the computer 110 in this disclosure. Further, as mentioned below, various controllers and/or sensors 130 may provide data to the computer 110 via the vehicle communication network.

In addition, the computer 110 may be configured for communicating through a wireless communication interface with a remote navigation computer 180. The wireless communication interface may communicate via a communication network 170. The communication network 170 may be one or more of wireless communication mechanisms, including any desired combination of wireless (e.g., cellular, wireless, satellite, microwave and radio frequency) communication mechanisms and any desired network topology (or topologies when multiple communication mechanisms are utilized). Exemplary V-to-V communication networks include cellular such as Long-Term Evolution (LTE), Bluetooth™, IEEE 802.11, dedicated short range communications (DSRC), and/or wide area networks (WAN), including the Internet, providing data communication services.

The wireless communication interface may include known electronic circuitry such as a wireless (or radio frequency) signal transceiver 150 and an amplifier circuit to boost an outgoing and incoming radio frequency signal. The vehicle 100 computer 110 may be programmed to receive a wireless signal, via the wireless signal transceiver 150. The computer 110 may be programmed to receive a wireless message (including one or more wireless signals) via the wireless transceiver 150 from, e.g., the remote navigation computer 180, a wireless local navigation system 160, etc. The wireless signal transceiver 150 may be configured to receive wireless signals based on various wireless communication protocols, e.g., LTE, Bluetooth™ WAN, etc.

Sensors 130 may include a variety of devices known to provide data via the vehicle communications bus. For example, the sensors 130 may include one or more cameras, radars, and/or Light Detection and Ranging (LIDAR) sensors disposed in the vehicle 100 providing data encompassing at least some of the vehicle exterior. The data may be received by the computer 110 through a suitable interface such as is known.

The sensors 130 may also include a GPS (global positioning system) device. A GPS sensor 130 may transmit, e.g., via the computer 110, current geographical coordinates, e.g., latitude and longitude as are known, of the vehicle 100.

The actuators 120 typically include circuits, chips, or other electronic components that can actuate various vehicle subsystems in accordance with appropriate control signals as is known. For instance, the actuators 120 may include one or more relays, servomotors, etc. The actuators 120, therefore, may be used to control braking, acceleration, and steering of the host vehicle 100. The control signals used to control the actuators 120 may be generated by the computer 110, a control unit located in the vehicle 100, e.g., the brake controller, etc.

The HMI 140 may be configured to receive user input, e.g., during operation of the vehicle 100. As one example, an HMI 140 may include touchscreens, buttons, knobs, keypads, microphone, and so on for receiving information from a user. Moreover, an HMI 140 may include wirelessly connected devices such as a smart phone, etc., for receiving information from a user and/or output information to the user. The computer 110 may be programmed to receive configuration data via the HMI 140.

The wireless local navigation system 160 may include a processor, a memory, and a transceiver, whereby the memory stores instructions by which the processor is programmed to actuate the transceiver to send a wireless message. The local navigation system 160 may include a housing and may be mounted to a building or other structure and/or may be portable so that a user may move the wireless local navigation system 160 from a first location to a second location. The wireless local navigation system 160 may include electronic circuitry such as a wireless, e.g., a or radio frequency, signal transceiver, as well as an amplifier circuit to boost an outgoing and incoming radio frequency signal. The local navigation system 160 processor may be programmed to transmit and/or receive a wireless signal, via the local navigation system 160 transceiver. The local navigation system 160 transceiver may be programmed to transmit a wireless message (including one or more wireless signals) via the local navigation system 160 transceiver to, e.g., the vehicle 100, the remote navigation computer 180, etc. The local navigation system 160 transceiver may transmit and/or receive wireless signals based on various wireless communication protocols, e.g., LTE, Bluetooth™, WAN, etc. The local navigation system 160 processor may be programmed to transmit a wireless message upon receiving an actuating instruction. For example, as discussed below, the local navigation system 160 processor may be programmed to transmit a wireless message to the vehicle 100 upon receiving an instruction from the remote navigation computer 180.

The computer 110 may be programmed to determine a distance $d_1$ from the local navigation system 160 to the vehicle 100 transceiver 150, e.g., using techniques such as Free Space Path Loss (FSPL). The computer 110 may be programmed to determine a strength of a wireless signal of the local navigation system 160 based on data received from the wireless signal receiver 150. Based on FSPL, a loss (weakening) of an electromagnetic signal over a straight path between a transmitter, e.g., the local navigation system 160, and a receiver, e.g., the wireless signal transceiver 150, may be proportional to the square of the distance (or distance $d_1$) between the transmitter and receiver, and also proportional to the square of a frequency of the radio signal.

For example, the computer 110 may be programmed to determine the distance $d_1$ upon determining the frequency of signals transmitted by the local navigation system 160 and the loss of the signal received by the wireless signal transceiver 150. The computer 110 may be programmed to determine the frequency of the received signal based on a frequency associated to a used communication protocol and/or using known Digital Signal Processing (DSP) techniques. The computer 110 may be programmed to determine a loss of the received signal based on determining the output power of the local navigation system 160 and the signal strength of the received signal based on data received from the wireless signal receiver 150.

Figure 2A:
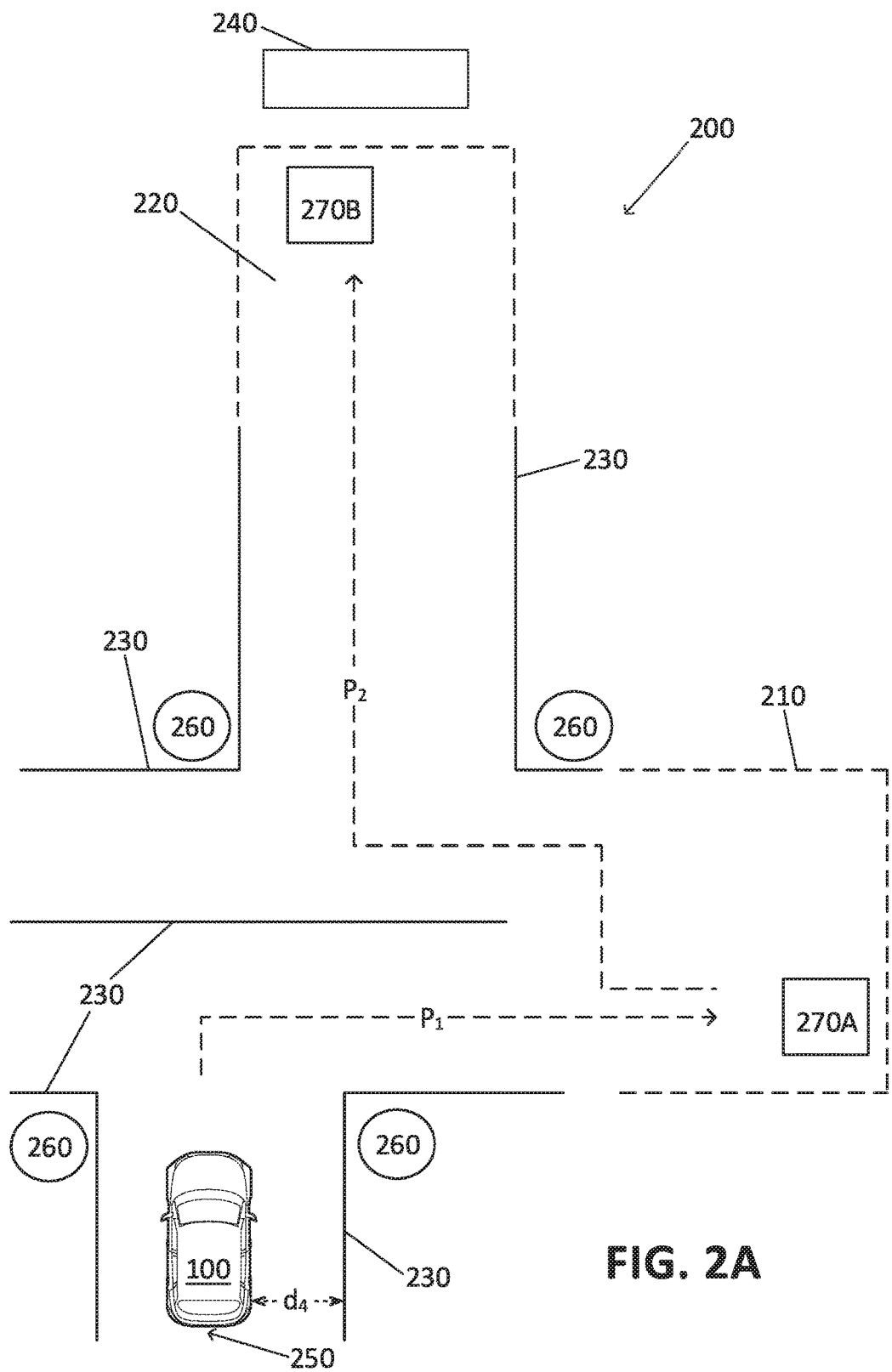
FIG. 2A is a block diagram of a vehicle of FIG. 1 in a facility with landmarks.

With reference to FIG. 2A, the computer 110 may be programmed to navigate a vehicle 100 to a first location upon receiving a first message from a local navigation system 160A, 160B, the remote navigation computer 180, etc., including a map, and a current vehicle 100 location. Further, after stopping the vehicle 100 at the first location, the computer 110 may be programmed to navigate the vehicle 100 to a second location upon receiving a second message. The computer 110 may be programmed to receive the first and/or second message from the remote navigation computer 180. The computer 110 may be programmed to determine whether to navigate the vehicle 100 based on received message(s) from one or more local navigation systems 160A, 160B only if the received message(s) meet security requirements, e.g., include a password, security key, etc.

The map may include data describing an area 200 and may have a reference point within the area 200, e.g., a location 250 where a vehicle 100 production line ends and from which the vehicle 100 starts the navigation. Further, the map data can describe locations of walls, roads, doorways, etc., i.e., characteristics of the area 200 relevant to navigation of the vehicle 100. The location coordinates in the map may include lateral and longitudinal coordinates relative to the reference point of the map, e.g., the location 250. That is, the reference point may serve as a point of origin in a two-dimensional Cartesian coordinate system, which can also be referred to as a local coordinate system in the context of this disclosure, whose points are locations in the area 200. Accordingly, the vehicle 100 can navigate in the area 200 even where the global positioning system (GPS) is not available.

For example, the map may include location coordinates of location markers 260 such as cones, posts, patterns painted on walls, text painted on walls, signs with text and or icons or images, traffic signs, etc. The map may include locations of location landmarks 270A, 270B along with physical characteristics of respective landmarks by which vehicle 100 sensors can identify the landmarks. For example, such physical characteristics could include dimensions of an opening, a machine, a door, a ramp, etc. Markers 260 and landmarks 270 may be used together and/or interchangeably for vehicle 100 navigation; they are distinguished herein with markers 260 being artifacts that are placed in the area 200 for the purpose of facilitating vehicle 100 navigation, whereas landmarks 270 are artifacts that are present in the area 200 and can be used for vehicle 100 navigation, even if not placed there for that purpose.

The vehicle 100 location included in the first message may refer to, e.g., the location 250, or any location where an autonomous navigation of the vehicle 100 to the first, second, etc. locations begins.

The first and/or second message(s) may include an identifier such as a Vehicle Identification Number (VIN) of the vehicle 100. The computer 110 may be programmed to determine whether the received first and/or second message is directed to the vehicle 100 based on the identifier included in the respective message.

In one example, the first location is within a first vehicle standing or storage area 210 in a vehicle 100 area 200, and the second locations is within a vehicle standing or storage area 220 of the area 200, e.g., a loading zone of a train 240. Thus, advantageously, the computer 110 may navigate vehicles 100 to the first area 210 (which could be, for example, an area in a vehicle assembly plant at which vehicles 100 are inspected prior to shipping), and then to the second area 220 based on respective first and second locations.

The computer 110 can be programmed to navigate the vehicle 100 to the first location, second location, etc. by operating the vehicle 100 in an autonomous mode. The computer 110 may be programmed to actuate one or more vehicle 100 actuators 120 to accelerate, steer, and/or brake. The computer 110 can be programmed to navigate the vehicle 100 to a third, fourth, etc. location based on receiving a third, fourth, etc. message.

The map, in the present context, includes coordinates of the lane marking(s) 230, boundaries of the areas such as the first and second areas 210, 220, location coordinates of location markers 260, location coordinates of landmarks 270A, 270B, and/or any other type of information associated with navigation of the vehicles 100 in an area 200. The landmarks 270A, 270B, as explained above in the present context, refer to physical structures, e.g., an overhead gantry, and/or physical artifacts present in the area 200, e.g., textual information and/or graphical patterns associated with respective locations in the area 200.

The computer 110 may be programmed to receive image data from the vehicle 100 sensor(s) 130, and to navigate the vehicle 100 based on the received map and image data. The image data may include data received from the vehicle 100 radar, camera, and/or LIDAR sensor 130. The computer 110 may be programmed to detect the location markers 260 and/or landmarks 270A, 270B based on the received image data and identify vehicle 100 location coordinates based on the location coordinates of the identified location marker 260, landmarks 270A, 270B, etc.

The computer 110 may be programmed to detect, e.g., a cone shape, of a location marker 260 and to determine a location of the vehicle 100 relative to the location marker 260 based on the received image data. The computer 110 may be programmed to identify location coordinates of the detected location marker 260 based on the map data and determine the location coordinates of the vehicle 100 based on the identified location coordinates of the location marker 260 and the determined location of the vehicle 100 relative to the location marker 260. Additionally or alternatively, the computer 110 may be programmed to detect the location markers 260 based on graphical patterns printed on the floor, walls, etc.

The computer 110 may be programmed to detect lane marking(s) 230 and determine the vehicle 100 location coordinates based on the detected lane marking(s) 230 and the map data. In other words, the map data may include location coordinates of the lane markings 230 and the computer 110 may be programmed to determine the location coordinates based on the location coordinates of the detected lane markings 230. In another example, the computer 110 may be programmed to determine location coordinates of the vehicle 100 based at least on two of lane markings 230, location marker 260, and landmarks 270A, 270B. For example, when multiple cone-shaped location markers 260 are present in the area 200, the computer 110 may be programmed to determine the vehicle 100 location coordinates based on a combination of locations coordinates of location markers 260 and lane markings 230. Thus, lane markings 230 can effectively serve as location markers 260.

The computer 110 may be programmed to identify the paths $P_1$, $P_2$ (discussed above) by determining a shortest path from the current location of the vehicle 100 to the respective location, e.g., the first location. The computer 110 may be programmed to determine the shortest path based on the received map, the current vehicle 100 location using known route planning techniques.

In one example, the computer 110 may be programmed to maintain a lateral distance $d_4$ from the vehicle 100 to the lane marking 230 while navigating the vehicle 100 to the first or second location. The computer 110 may be programmed to maintain the distance $d_4$ by actuating the vehicle 100 steering actuator 120 using known lane keeping techniques.

In another example, the computer 110 may be programmed to navigate the vehicle 100 further based on communication with one or more local navigation systems 160A, 160B. For example, with reference to FIG. 2B, the computer 110 may be programmed to navigate a vehicle 100 to a first location upon receiving a first message from a first local navigation system 160A, and then, after stopping the vehicle 100 at the first location, navigate the vehicle 100 to a second location upon receiving a second message from a second local navigation system 160B at the second location. In this context, navigating the vehicle 100 to a local navigation system 160 location means that the vehicle 100 is within a predetermined distance, e.g., 10 meters, 25 meters, etc., of the local navigation system 160. The local navigation systems 160A, 160B may have small dimensions relative to a vehicle 100 size, e.g., a length and/or width of 50 centimeters. Thus, in one example, each of the local navigation system 160 locations could be defined as an area defined by a radius of 5 meters around the local navigation system 160.

The message may include an instruction to navigate the vehicle 100 to a location of the local navigation system 160 (e.g., with reference to FIG. 2B, one of the local navigation systems 160A, 160B) that transmitted the message. The message may include an instruction to stop the vehicle 100.

In one example, the first local navigation system 160A may be moved, e.g., by a human user and/or a robot, from the first location to the second location instead of using two local navigation systems 160A, 160B.

In one example, the remote navigation computer 180 may be programmed to receive an identifier of a vehicle 100 that is ready for transportation to a first area 210 of the area 200, and actuate the first local navigation system 160A to transmit a first message to the vehicle 100, e.g., by including its identifier. The remote navigation computer 180 may be programmed to determine an available space in the first area 210 and/or the second area 220 based on the received vehicle 100 identifier. Additionally or alternatively, the remote navigation computer 180 may be programmed to identify the first location and/or the second location based on an availability of space in the first area 210 and/or the second area 220 respectively. The remote navigation computer 180 may be programmed to select the first local navigation system 160A from multiple local navigation systems 160 based on the determined availability of space. The remote navigation computer 180 may be further programmed to actuate a robot to move the first local navigation system 160A to a determined available space and/or instruct a human user to carry the first local navigation system 160A to the determined available space.

The computer 110 may be programmed to stop the vehicle 100 at the first location by deactivating a vehicle 100 powertrain upon arriving at the first location. The computer 110 may be programmed to deactivate the vehicle 100 powertrain upon determining that the distance $d_2$ from the vehicle 100 to the local navigation system 160A is less than a distance threshold, e.g., 2 meters. Additionally or alternatively, the computer 110 may be programmed to stop the vehicle 100 at the first location upon receiving a message from the local navigation system 160A and/or the remote navigation computer 180 instructing the vehicle 100 to stop. For example, the remote navigation computer 180 may be programmed to determine that the vehicle 100 arrived at the first location based on image data received from object detecting sensors such as camera sensors installed in the area 200. The local navigation system 160A processor may be programmed to determine that the vehicle 100 arrived at the first location based on a strength of a wireless signal received from the vehicle 100 wireless transceiver 150.

The computer 110 may be programmed to determine a direction to the first location based on the first message, and navigate the vehicle to the first location based on the determined direction to the first location. The computer 110 may be programmed to determine the direction to the first location based on a change of the distance $d_2$, $d_3$ to the local navigation systems 160A, 160B. The computer 110 may be programmed to actuate a vehicle 100 actuator 120 to move the vehicle 100 and determine that the moving direction is the direction to the local navigation system 160A upon determining that the distance $d_2$ reduces.

The computer 110 may be programmed to receive image data from a vehicle 100 sensor 130, identify a path $P_1$ to the first location based on the received image data and the first message, and navigate the vehicle 100 to the first location via the identified path $P_1$.

The computer 110 may be programmed to identify the paths $P_1$, $P_2$ based on lane markings 230 detected in the image data received from the vehicle 100 camera sensor(s) 130. The computer 110 may be programmed to navigate the vehicle 100 to the first location based on the determined distance $d_2$. The area 200 may have predetermined lane markings 230 as a guidance for the vehicles 100. Thus, the vehicle 100 computer 110 may be programmed to detect the lane markings 230 on the ground surface, e.g., based on data received from the vehicle 100 camera sensor 130. The computer 110 may be programmed to navigate the vehicle 100 by identifying a path $P_1$ from a vehicle 100 current location to the first location based on the detected lane makings 230 and the determined distance $d_2$.

In one example, the lane markings 230 and/or any other suitable type of guidance are permanently installed to and/or painted on the ground surface. Additionally or alternatively, the area 200 may include lane markings 230 that are electrically configurable. For example, the remote navigation computer 180 may be programmed to actuate the one or more lane markings to illuminate or to deactivate.

The computer 110 may be programmed to identify the paths $P_1$, $P_2$ by determining a shortest path from the current location of the vehicle 100 to the respective location, e.g., the first location. Additionally, the computer 110 may be programmed to receive a map of area 200 lane markings 230 from, e.g., the remote navigation computer 180 and determine the paths $P_1$, $P_2$ based on the detected lane markings 230, the received map, and the distance $d_2$, $d_3$ to the first or second location.

In one example, the computer 110 may be programmed to maintain a lateral distance $d_4$ from the vehicle 100 to the lane marking 230 while navigating the vehicle 100 to the first or second location. The computer 110 may be programmed to maintain the distance $d_4$ by actuating the vehicle 100 steering actuator 120 using known lane keeping techniques.

The computer 110 may be programmed to prevent a collision with an object, e.g., another vehicle 100, an obstacle, etc., by detecting the objects on the identified paths $P_1$, $P_2$ based on data received from the vehicle 100 sensors 130, e.g., LIDAR, radar, camera sensor(s) 130.

Upon arrival of the vehicle 100 at the second location, the computer 110 may deactivate a local navigation system-based navigation of the vehicle 100. "Local navigation system-based navigation", herein, means an actuation of the vehicle 100 to move upon receiving a message from a local navigation system 160 and/or the remote navigation computer 180. For example, the computer 110 may be programmed to store data in the computer 110 memory that inhibits any further movement of the vehicle 100 based on a message received from a local navigation system 160, e.g., upon receiving an instruction from the remote navigation computer 180 to stop a local navigation system-based navigation, upon determination that the vehicle 100 arrived at the second location, upon receiving a message from the second local navigation system 160B including an instruction to stop a local navigation system-based vehicle 100 navigation, etc. This may be advantageous to prevent an unexpected local navigation system-based movement of the vehicle 100 after arriving at the second location.

Processing

Figure 3A:
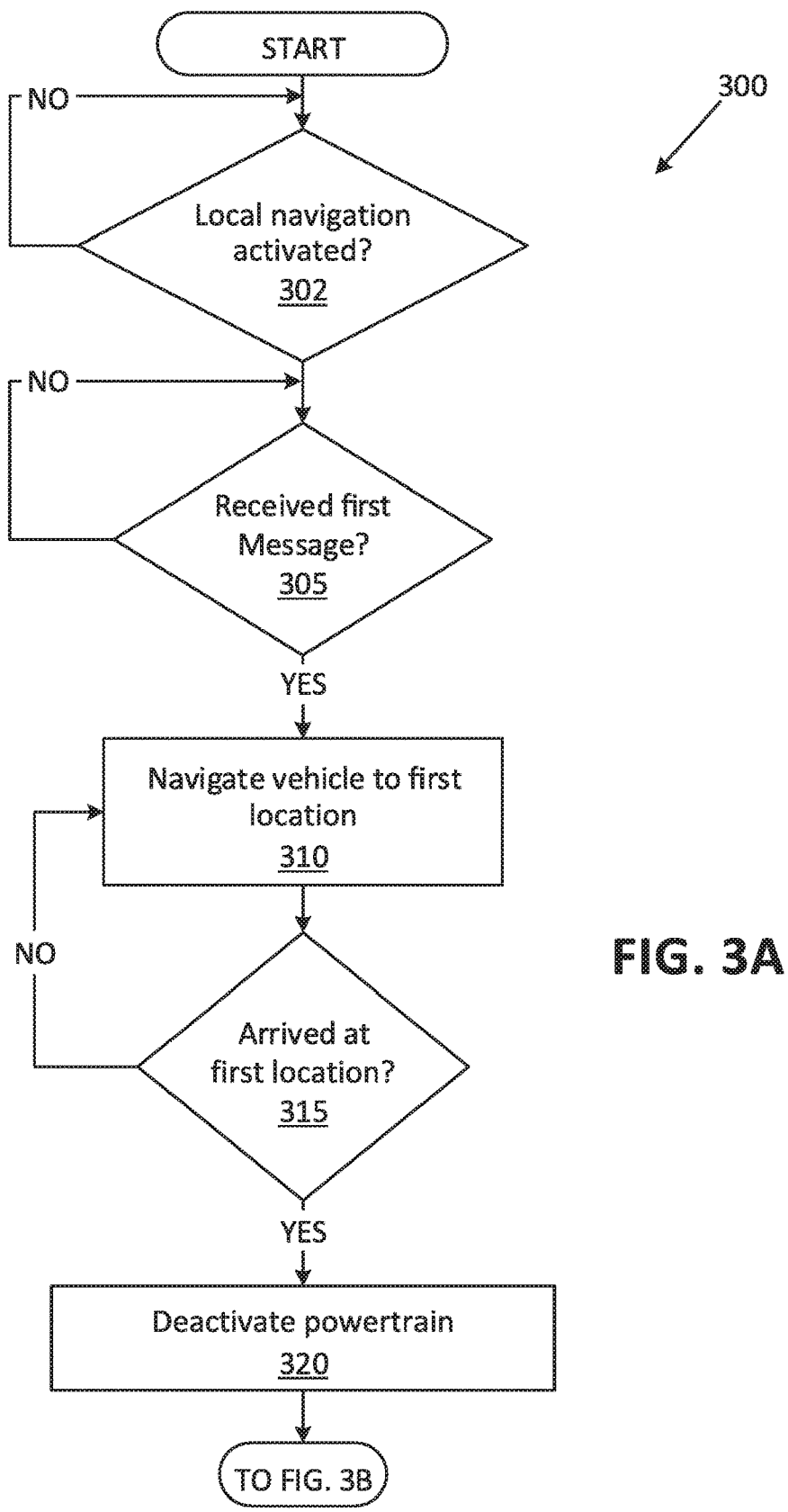

FIGS. 3A-3B is a flowchart of an exemplary process 300 for navigating a vehicle to a first and then to a second location. For example, the vehicle 100 computer 110 may be programmed to execute blocks of the process 300.

The process 300 begins in a decision block 302, in which the computer 110 determines whether a local navigation system-based navigation of the vehicle 100 is activated. For example, the computer 110 may be programmed to determine that the local navigation-system based navigation of the vehicle 100 is activated upon receiving an instruction, e.g., from a remote computer such as a production plant computer, dealer service tester device, etc., including a local navigation activation command. Additionally, the computer 110 may be programmed to determine that local navigation system-based navigation is activated only if the instruction was received from a transmitter that meets security requirements, e.g., the instructions includes a password, security key, etc. If the computer 110 determines that the local navigation system-based navigation is activated, then the process 300 proceeds to a decision block 305; otherwise the process 300 returns to the decision block 302.

In the decision block 305, the computer 110 determines whether the first message is received, e.g., from a first local navigation system 160A. In one example, the received first message includes an instruction for the vehicle 100 to navigate to a first location of the first local navigation system 160A. Additionally, the first message may include an identifier such as a Vehicle Identification Number (VIN) of the vehicle 100. The computer 110 may be programmed to determine whether the received first message is directed to the vehicle 100 based on the identifier included in the first message. The first message may include a vehicle 100 location and a map describing the area 200 and may have a reference point within the area 200, e.g., a location 250 where a vehicle 100 production line ends and from which the vehicle 100 starts the navigation. If the computer 110 determines that the first message is received, then the process 300 proceeds to a block 310; otherwise the process 300 returns to the decision block 305.

In the block 310, the computer 110 navigates the vehicle 100 to the first location, i.e., actuates vehicle powertrain, steering, and brakes to moves the vehicle 100 to the first location. The computer 110 may be programmed to identify a path $P_1$ to the first location based on the received first message. The computer 110 may be programmed to receive image data from the vehicle 100 sensor(s) 130, and to navigate the vehicle 100 based on the received map and image data. The image data may include data received from the vehicle 100 radar, camera, and/or LIDAR sensor 130. In one example, as discussed above with reference to FIG. 2A, the computer 110 may be programmed to detect the location markers 260 and/or landmarks 270A, 270B based on the received image data and to identify vehicle 100 location coordinates based on the location coordinates of the identified location marker 260, landmarks 270A, 270B, etc. Additionally or alternatively, the computer 110 may be programmed to identify the path P1 based on the received first message and lane markings 230 detected based on image data received from the vehicle 100 camera sensor(s) 130. In another example, as discussed above with reference to FIG. 2B, the computer 110 may be programmed to navigate the vehicle 100 based at least in part on communication with one or more local navigation systems 160A, 160B. The computer 110 may be programmed to navigate the vehicle 100 based on the identified path $P_1$ to the first location. The computer 110 may be programmed to periodically, e.g., each 100 milliseconds, receive a message from the first local navigation system 160A and navigate the vehicle 100 based at least in part on the received messages.

Figure 2B:
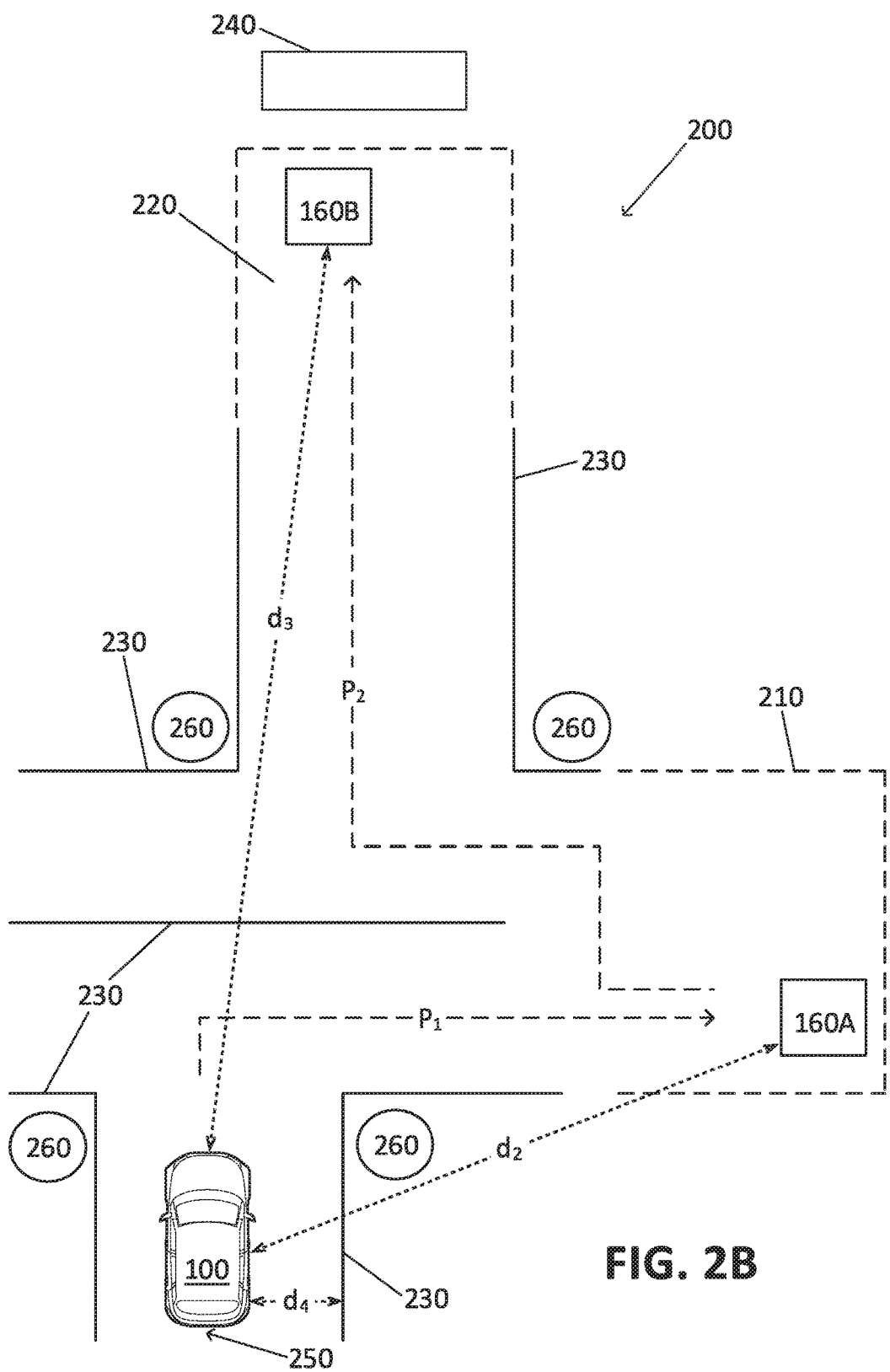
FIG. 2B is a block diagram of the vehicle of FIG. 1 communicating with a first and a second local navigation system.

Next, in a decision block 315, the computer 110 determines whether the vehicle 100 has arrived at the first location. In one example shown in FIG. 2A, the computer 110 may be programmed to determine that the vehicle 100 has arrived at the first location based on the received image data, e.g., including the location landmark 270A and the map. In another example as shown in FIG. 2B, the computer 110 may be programmed to determine that the vehicle 100 has arrived at the first location upon determining that the distance $d_2$ to the first local navigation system 160A is less than a distance threshold, e.g., 2 meters. Additionally or alternatively, the computer 110 may be programmed to determine that the vehicle 100 has arrived at the first location based on data received from the remote navigation computer 180 and/or the first local navigation system 160A. If the computer 110 determines that the vehicle 100 has arrived at the first location, then the process 300 proceeds to a block 320; otherwise the process 300 returns to the decision block 315.

In the block 320, the computer 110 deactivates the vehicle 100 powertrain. For example, the computer 110 may be programmed to deactivate an ignition switch of the vehicle 100 and/or turns off an engine control ECU.

Continuing the description of the process 300 now with reference to FIG. 3B, next, in a decision block 325, the computer 110 determines whether a second message is received, e.g., from a second local navigation system 160B. The second message may include an instruction to navigate the vehicle 100 to a second location of the second local navigation system 160B. If the computer 110 determines that the second message is received, then the process 300 proceeds to a block 330; otherwise the process 300 returns to the decision block 325.

In the block 330, which may follow the block 225, the computer 110 navigates the vehicle 100 to the second location of the second local navigation system 160B. The computer 110, as described above, is programmed to navigate the vehicle 100 by actuating vehicle 100 actuators 120 to accelerate, steer, and/or brake. The computer 110 may be programmed to identify a path $P_2$ from the first location to the second location based on the received second message, the map, etc. Additionally, the computer 110 may be programmed to identify the path $P_2$ based on lane markings 230 detected based on image data received from the vehicle 100 camera sensor(s) 130.

Next, in a decision block 335, the computer 110 determines whether the vehicle 100 has arrived at the second location. In one example shown in FIG. 2A, the computer 110 may be programmed to determine that the vehicle 100 has arrived at the first location based on the received image data, e.g., including the location landmark 270A and the map. In another example shown in FIG. 2B, the computer 110 may be programmed to determine that the vehicle 100 arrived at the second location upon determining that the distance $d_3$ to the second local navigation system is less than a distance threshold, e.g., 2 meters. Additionally or alternatively, the computer 110 may be programmed to determine that the vehicle 100 arrived at the second location based on data received from the remote navigation computer 180 and/or the first local navigation system 160A. If the computer 110 determines that the vehicle 100 arrived at the first location, then the process 300 proceeds to a block 340; otherwise the process 300 returns to the decision block 335.

In the block 340, the computer 110 deactivates a local navigation system-based navigation of the vehicle 100. For example, the computer 110 may be programmed to store information in a computer 110 memory indicating that local navigation system-based movement of the vehicle 100 is deactivated, i.e., the vehicle 100 computer 110 will no longer monitor for messages from local navigation systems 160 and/or the remote navigation computer 180, nor will the computer 110 cause the vehicle 100 navigate to local navigation system 160 locations and/or location landmarks 270. Following the block 340, the process 300 ends, or alternatively returns to the decision block 305 (see FIG. 3A), although not shown in FIG. 3B.

Figure 4:
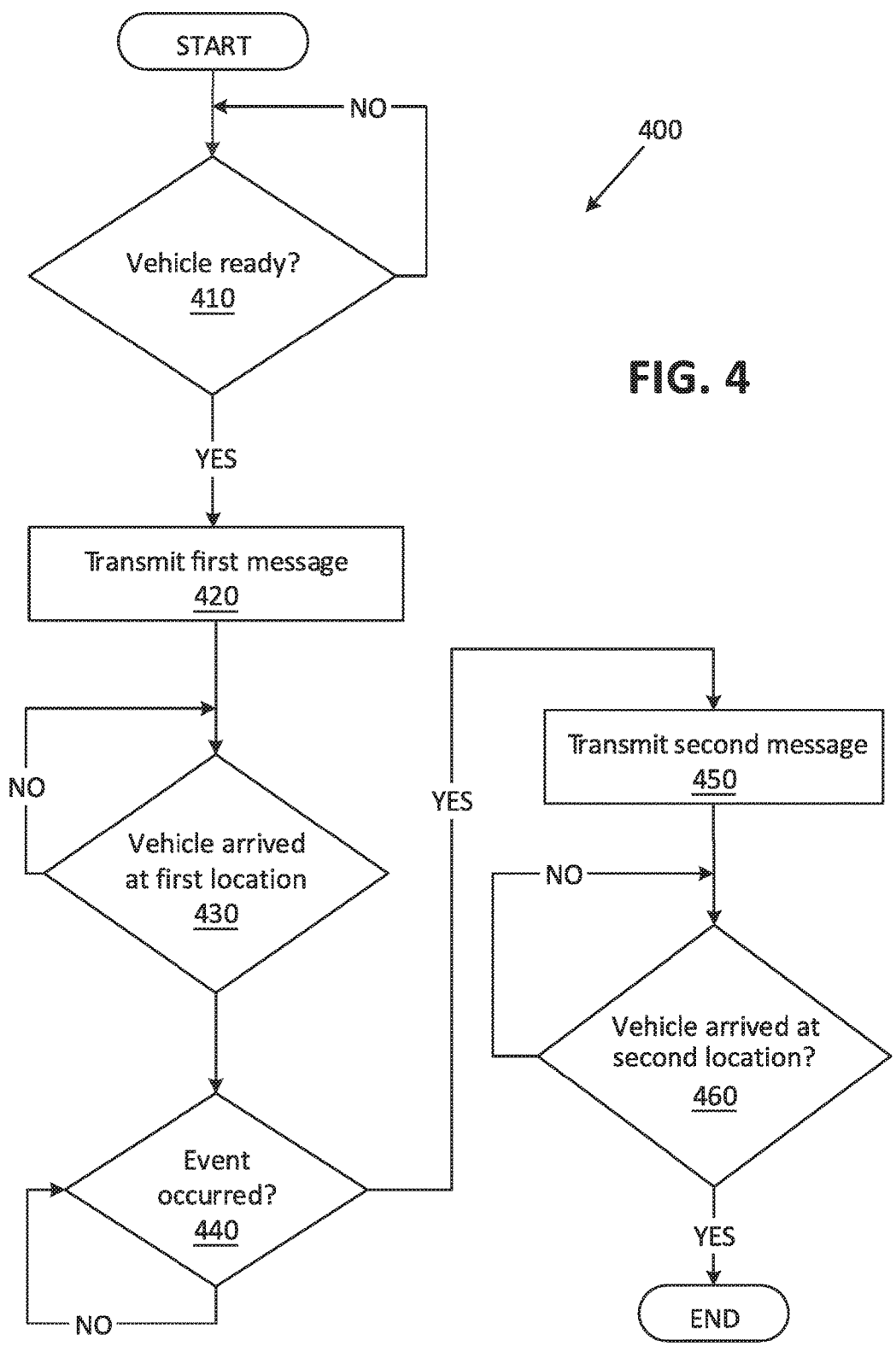
FIG. 4 is a flowchart of an exemplary process for controlling vehicle computers to navigate.

FIG. 4 is a flowchart of an exemplary process 400 for controlling vehicle 100 computers 110 to navigate to a first and then a second location. For example, the remote navigation computer 180, the local navigation system(s) 160A, 160B, and/or a combination thereof may be programmed to execute blocks of the process 400.

The process 400 begins in a decision block 410, in which the remote navigation computer 180 determines whether a vehicle 100 is ready (e.g., the vehicle 100 may be ready to proceed to an inspection zone of a manufacturing plant). For example, the remote navigation computer 180 may be programmed to determine that a vehicle 100 is ready upon receiving an identifier of the vehicle 100 that is ready for navigation to a first area 210 of the area 200. In one example, the remote navigation computer 180 determines that the vehicle is ready based on information received from a vehicle 100 production computer including the vehicle 100 identifier and location coordinates, e.g., of an end of the production line, etc. If the remote navigation computer 180 determines that the vehicle 100 is ready, then the process 400 proceeds to a block 420; otherwise the process 400 returns to the decision block 410.

In the block 420, the remote navigation computer 180 transmits a first message to the vehicle 100. In one example, the remote navigation computer 180 transmits, e.g., via a wireless communication interface, the first message including the map of the area 200, the vehicle 100 location, and the first location landmark 270A, to the vehicle 100. In another example, the remote navigation computer 180 actuates a first local navigation system 160A to transmit a first message to the vehicle 100. The remote navigation computer 180 may be programmed to actuate the first local navigation system 160A to transmit the first message including the identifier, e.g., the VIN, of the vehicle 100 and an instruction to navigate the vehicle 100 to a first location of the first local navigation system 160A. The remote navigation computer 180 may be programmed to identify the first location based on an availability of space to accommodate the vehicle 100 in the first area 210. Additionally, the remote navigation computer 180 may be programmed to select the first local navigation system 160A from multiple local navigation systems 160 based on the determined availability of space. The remote navigation computer 180 may be further programmed to actuate a robot to move the first local navigation system 160A to a determined available space and/or instruct a human user to carry the first local navigation system 160A to the determined available space.

Next, in a decision block 430, the remote navigation computer 180 determines whether the vehicle 100 has arrived at the first location. The remote navigation computer 180 may be programmed to determine whether the vehicle 100 has arrived at the first location based on data received from the first local navigation system 160A, image data received from sensors installed in the area 200, etc. If the remote navigation computer 180 determine that the vehicle 100 has arrived at the first location, then the process 400 proceeds to a decision block 440; otherwise the process 400 returns to the decision block 430.

In the decision block 440, the remote navigation computer 180 determines whether an event has occurred. An "event" in this context means identification of data that the computer 180 has stored as a criteria or criterion for moving the vehicle 100 to a second location. An example of data that, when identified by the computer 180, would indicate an event could be an indication that the vehicle 100 is ready for shipping, has passed inspection, is ready for servicing, has completed servicing, etc. If the remote navigation computer 180 determines that an event has occurred, then the process 400 proceeds to a decision block 444; otherwise the process 400 returns to the decision block 440, or alternatively, the process 400 ends, although not shown in FIG. 4.

In the block 450, the remote navigation computer 180 transmits a second message to the vehicle 100. In one example, the remote navigation computer 180 may transmit, e.g., via the wireless communication interface, a second message including the second location landmark 270B to the vehicle 100. The remote navigation computer 180 may be programmed to identify the second location based on an availability of space for accommodating the vehicle 100 in the second area 220.

In another example, the remote navigation computer 180 may actuate a second local navigation system 160B to transmit a second message to the vehicle 100. The remote navigation computer 180 may be programmed to actuate the second local navigation system 160B to transmit a second message including the identifier, e.g., the VIN, of the vehicle 100 and an instruction to navigate the vehicle 100 to a second location of the second local navigation system 160B. Additionally, the remote navigation computer 180 may be programmed to select the second local navigation system 160B from multiple local navigation systems 160 based on the determined availability of space at the location of the local navigation system 160B (i.e., that location has space whereas others do not, or has more space than others). In this example, the remote navigation computer 180 may be programmed to determine whether a second local navigation system 160B is available at the second location. For example, the remote navigation computer 180 may be programmed to determine whether the second local navigation system 160B is available at the second location based on data received from the area 200 camera sensors, a received message from the second local navigation system 160B, global positioning system data from the local navigation system 160B, etc. If the remote navigation computer 180 determines that a second local navigation system 160B is unavailable at the second location, then the remote navigation computer 180 may instruct a movement of a local navigation system 160 to the second location, e.g., moving the first local navigation system 160A from the first location to the second location. It may be possible to move a local navigation system 160 to a location identified as having space for vehicles 100 and/or to which it is determined that vehicles 100 should be moved, e.g., because of the availability of service technicians or the like. The remote navigation computer 180 may be programmed to instruct a robot to move the first local navigation system 160A to a determined available space and/or instruct a human user to carry the first local navigation system 160A to the determined available space. In other words, the second location for the vehicle 100 will be then the new location of the first local navigation system 160A. The first local navigation system 160A that has moved to the second location (either by the robot or a human user) will be then here below referred to as the second local navigation system 160B.

Next, in a decision block 460, the remote navigation computer 180 determines whether the vehicle 100 has arrived at the second location. The remote navigation computer 180 may be programmed to determine whether the vehicle 100 has arrived at the second location based on data received from the second local navigation system 160B, image data received from sensors installed in the area 200, etc. If the remote navigation computer 180 determines that the vehicle 100 has arrived at the second location, then the process 400 ends, or alternatively returns to the decision block 410, although not shown in FIG. 4; otherwise the process 400 returns to the decision block 460.

The article "a" modifying a noun should be understood as meaning one or more unless stated otherwise, or context requires otherwise. The phrase "based on" encompasses being partly or entirely based on.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a processor; and a memory, the memory storing instructions executable by the processor to:
   upon receiving a first message including a map, and a vehicle location, navigate the vehicle to a first location by actuating a vehicle actuator based on a strength of a wireless signal received from a first local navigation system at the first location; and
   then, after stopping the vehicle at the location, navigate the vehicle to a second location by actuating at least one of the vehicle actuator or a second actuator based on a strength of a second wireless signal received from a second local navigation system at the second location, upon receiving a second message.

2. The system of claim 1, wherein the second message includes the second location.

3. The system of claim 1, wherein the map specifies locations according to a two-dimensional Cartesian coordinate system.

4. The system of claim 1, wherein the map includes coordinates of location markers including at least one of a cone, a post, a pattern, a text, and a sign.

5. The system of claim 4, wherein the map further includes physical characteristics of the location markers.

6. The system of claim 1, wherein the memory stores further instructions executable by the processor to determine current location coordinates of the vehicle by:
   detecting a location marker based on received image data;
   determining a location of the vehicle relative to the location marker; and
   determining the current location coordinates of the vehicle based on the detected location marker and the determined location of the vehicle relative to the location marker.

7. The system of claim 1, wherein the memory stores further instructions executable by the processor to:
   receive image data from a vehicle sensor;
   identify a path to the first location based on the received image data and the first message; and
   navigate the vehicle to the first location via the identified path.

8. The system of claim 7, wherein the memory stores further instructions executable by the processor to identify the path based on at least one of lane markings and location markers detected in the received image data.

9. A method, comprising:
   upon receiving a first message including a map, and a vehicle location, navigating the vehicle to a first location by actuating a vehicle actuator based on a strength of a wireless signal received from a first local navigation system at the first location; and
   then, after stopping the vehicle at the location, navigating the vehicle to a second location by actuating at least one of the vehicle actuator or a second actuator based on a strength of a second wireless signal received from a second local navigation system at the second location, upon receiving a second message.

10. The method of claim 9, wherein the second message includes the second location.

11. The method of claim 9, wherein the map specifies locations according to a two-dimensional Cartesian coordinate system.

12. The method of claim 9, wherein the map includes coordinates of location markers including at least one of a cone, a post, a pattern, a text, and a sign.

13. The method of claim 12, wherein the map further includes physical characteristics of the location markers.

14. The method of claim 9, further comprising determining current location coordinates by:
   detecting a location marker based on received image data;
   determining a location of the vehicle relative to the location marker; and
   determining the current location coordinates of the vehicle based on the detected location marker and the determined location of the vehicle relative to the location marker.

15. The method of claim 9, further comprising:
   receiving image data from a vehicle sensor;
   identifying a path to the first location based on the received image data and the first message; and
   navigating the vehicle to the first location via the identified path.

16. The method of claim 15, wherein identifying the path is based on at least one of lane markings and location markers detected in the received image data.

17. A system, comprising a processor; and a memory, the memory storing instructions executable by the processor to:
   upon receiving a first message including a map and a vehicle location from a first local navigation system at a first location, navigate the vehicle to the first location by actuating a vehicle actuator based on a strength of a wireless signal received from a first local navigation system; and
   then, after stopping the vehicle at the location, navigate the vehicle to a second location by actuating at least one of the vehicle actuator or a second actuator based on a strength of a second wireless signal received from a second local navigation system at the second location upon receiving a second message from the second local navigation system at the second location.

18. The system of claim 17, wherein the memory stores further instructions executable by the processor to:
   receive image data from a vehicle sensor;
   identify a path to the first location based on the received image data and the first message; and
   navigate the vehicle to the first location via the identified path.

19. The system of claim 18, wherein the memory stores further instructions executable by the processor to identify the path based on lane markings detected in the received image data.

20. The system of claim 17, wherein the memory stores further instructions executable by the processor to deactivate a vehicle powertrain upon arriving at the first location.

* * * * *